United States Patent [19]
Fielding

[11] Patent Number: 5,516,011
[45] Date of Patent: May 14, 1996

[54] ROLLER DISPENSER MACHINE

[75] Inventor: Randy L. Fielding, Fremont, Ohio

[73] Assignee: Christy Machine Company, Fremont, Ohio

[21] Appl. No.: 283,595

[22] Filed: Aug. 1, 1994

[51] Int. Cl.⁶ .................................................. G01F 11/46
[52] U.S. Cl. ........................................ 222/281; 222/342
[58] Field of Search .................................. 239/681, 683, 239/689, 142; 222/281, 272, 342, 290

[56] References Cited

U.S. PATENT DOCUMENTS

| | | | |
|---|---|---|---|
| 216,617 | 6/1879 | Jacquett | 222/281 |
| 250,976 | 12/1881 | Riedel | 222/281 |
| 251,131 | 12/1881 | Palmer | 222/281 |
| 257,951 | 5/1882 | Keller | 222/281 |
| 282,720 | 8/1883 | Gunckel | 222/281 X |
| 314,652 | 3/1885 | Clark | 222/281 |
| 1,680,487 | 8/1928 | Taylor . | |
| 2,080,694 | 5/1937 | Calkins . | |
| 3,070,264 | 12/1962 | Christy . | |
| 3,159,406 | 12/1964 | Morr et al. | 239/683 X |
| 3,613,953 | 10/1971 | Paules . | |
| 3,788,529 | 1/1974 | Christy . | |
| 3,836,054 | 9/1974 | Schon . | |
| 4,498,635 | 2/1985 | Fielding . | |
| 4,513,893 | 4/1985 | Baba . | |
| 4,595,128 | 6/1986 | Fielding . | |
| 5,188,262 | 2/1993 | Fielding . | |

FOREIGN PATENT DOCUMENTS

| | | | |
|---|---|---|---|
| 1444837 | 5/1965 | France | 239/683 |
| 1271036 | 6/1965 | Germany | 222/281 |

Primary Examiner—Kevin P. Weldon
Attorney, Agent, or Firm—Renner, Otto, Boisselle & Sklar

[57] ABSTRACT

A roller dispenser includes a pair of counter-rotating cylindrical grid die rolls disposed adjacent a bottom opening in a hopper containing material to be dispensed. The grid die rolls have openings therein which assist in separating the material within the hopper prior to depositing the material on receiving articles or products passing therebeneath. Within the grid die rolls are shields or deflector plates which prevent the material entering the grid die rolls through openings in the upper surface of the grid die rolls from completely filling up the interior of the grid die rolls. Pin rolls within the grid die rolls push the material beneath the shields or deflector plates out through openings in the lower surface of the grid die rolls, making the grid die rolls self cleaning. An agitating bar assembly within the hopper keeps the head pressure or weight of the mass of the material within the hopper from forcing the material between the grid die rolls and allowing the grid die rolls to separate the material at a controlled rate.

28 Claims, 4 Drawing Sheets

5,516,011

ROLLER DISPENSER MACHINE

FIELD OF THE INVENTION

This invention relates generally to a roller type dispenser machine for depositing on products or articles passing therebeneath relatively dry materials that are self-adhering and/or compactible or which tend to agglomerate, including but not limited to edible topping products containing substantial amounts of shortening or margarine.

BACKGROUND OF THE INVENTION

Dispensers that utilize dispensing rolls to discharge by sprinkling or dispersion various forms of flowable dry, or substantially dry materials onto products are generally known, for example, from U.S. Pat. No. 3,788,529, assigned to the same assignee as the present application. However, such dispensers are not very effective in dispensing materials that are self-adhering and/or compactible, or which tend to agglomerate. These materials tend to clog the dispenser hoppers. Also the dispensing rolls tend to form a hollowed out area in the material being dispensed, which prevents the material from being picked up by the dispensing rolls.

U.S. Pat. Nos. 4,498,655 and 5,188,262, also assigned to the same assignee as the present application, disclose different types of machines for dispensing self-adhering and/or compactible materials or materials which tend to agglomerate. However, these machines are not as effective in dispensing materials which have substantial amounts of shortening or margarine content.

SUMMARY OF THE INVENTION

The present invention is for a roller dispenser machine especially suited for separating and delivering a substantially uniform and regulated flow of self-adhering and/or compactible materials containing substantial amounts of shortening or margarine onto articles or products passing therebeneath. An example of such material is streusel topping for coffee cakes containing up to 25% shortening or margarine in conjunction with flour, cinnamon or other items such as molasses and the like.

In accordance with one aspect of the invention, the roller dispenser includes a pair of counter-rotating cylindrical grid die rolls disposed adjacent a bottom opening in a hopper containing material to be dispensed for separating the material received from the hopper and depositing the material on receiving articles or products passing therebeneath.

In accordance with another aspect of the invention, the grid die rolls are movable relative to each other to vary the spacing between the grid die rolls through which material passes.

In accordance with another aspect of the invention, an elongate hopper for the material to be dispensed has pivotable side walls to increase or decrease the surface area of the counter-rotating grid die rolls exposed to the stored material in the hopper.

In accordance with another aspect of the invention, an agitating bar assembly is mounted within the hopper in overlying relation to the vortex area between the grid die rolls to keep the head pressure or weight of the mass of the material within the hopper from forcing the material between the rolls and allowing the rolls to grind or separate the material at a controlled rate causing the material to flow through and between the rolls at a controlled rate.

In accordance with another aspect of the invention, the agitating bar assembly includes a head pressure relief plate that is oscillated back and forth to agitate the material within the hopper to assist in causing the material to move downwardly into contact with the grid die rolls.

In accordance with another aspect of the invention, shields or deflector plates mounted within the grid die rolls in underlying relation to the upper surface of the grid die rolls prevent the material entering the grid die rolls from completely filling up the interior of the grid die rolls.

In accordance with another aspect of the invention, pin rolls mounted within the grid die rolls push the material that passes by the leading edge of the shields or deflector plates out through openings in the bottom of the grid die rolls, making the grid die rolls self cleaning.

In accordance with another aspect of the invention, the shields or deflector plates within the grid die rolls are semi-cylindrical in shape and are movable about the center axes of the grid die rolls to vary the spacing between the leading edges of the shields or deflector plates and material flow path between the grid die rolls for increasing or decreasing the width of the material flow path through the grid die rolls.

These and other objects, advantages, features and aspects of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

DETAILED DESCRIPTION OF THE PREFERRED EMBODIMENT

Figure 1:
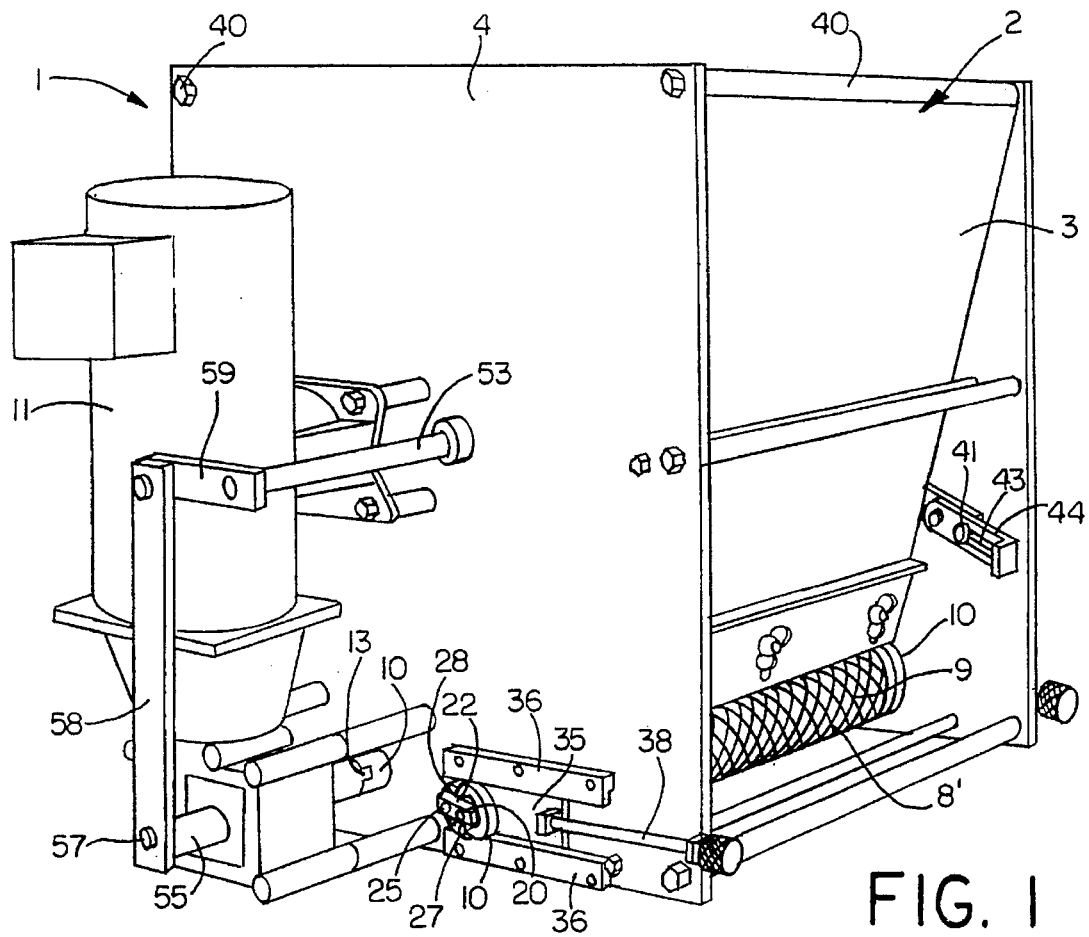
FIG. 1 is a schematic perspective view of a preferred form of roller dispenser machine in accordance with the present invention.

Referring now in detail to the drawings, and initially to FIGS. 1 through 4, a preferred form of roller dispenser machine according to the invention is generally indicated by the reference numeral 1. Such dispenser is particularly adapted to separate and deliver a uniform and regulated flow of self-adhering and/or compactible materials containing substantial amounts of shortening or margarine including, for example, streusel topping for deposit onto coffee cakes moving under the apparatus on a conveyor belt or the like, not shown. However, the machine may also be used for depositing more free flowing materials onto products or objects of various types passing therebeneath as well.

Figure 4:
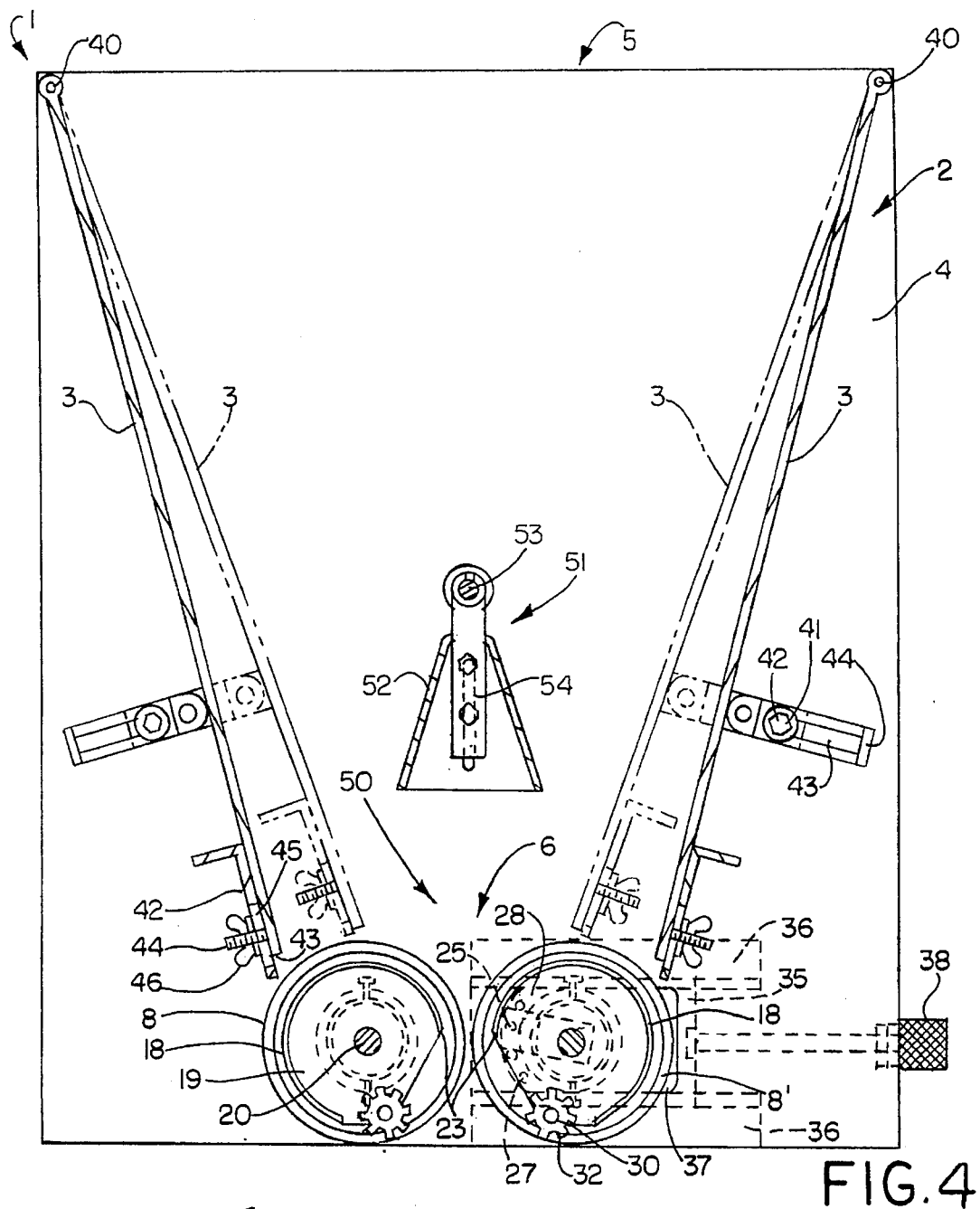
FIG. 4 is an enlarged fragmentary transverse section through the machine of FIG. 2 as seen from the plane of the line 4—4 thereof.

The roller dispenser 1 includes a hopper 2 having spaced apart, downwardly converging side walls 3 which are closed at their ends by a pair of end walls 4, thus defining a hopper having a relatively large area open top 5 for loading of the material into the hopper and a smaller area bottom discharge opening 6 (FIG. 4). Extending the full length of the bottom opening 6 in closely spaced relation thereto are a pair of counter-rotating cylindrical grid die rolls 8, 8' having a hollow interior and an exterior surface containing holes 9 throughout their length. The rolls 8, 8' are counter-rotated in a direction causing the upper surfaces of the rolls to move toward each other. As they do, the holes 9 in the rolls perform a grinding or separating action on the material as the material comes into contact with the rolls, breaking the material up sufficiently to permit the material to pass through and between the rolls for deposit onto receiving articles or products passing therebeneath as described hereafter.

By way of example, the grid die rolls 8, 8' may have a diameter of approximately four inches. Such rolls extend the entire length of the hopper 2 in closely spaced parallel relation to the bottom opening 6 with the axes of the rolls in the same horizontal plane and a minimum spacing between the outer diameter of the rolls of approximately ¼ inch throughout their length.

The rolls 8, 8' are preferably made out of an expanded metal grid material formed into cylinders of the desired diameter and having holes 9 throughout their length and circumference which break up the material within the hopper pressing against the grid die rolls and cause the hopper material to separate from adjacent material as the grid die rolls are counter-rotated.

Figure 2:
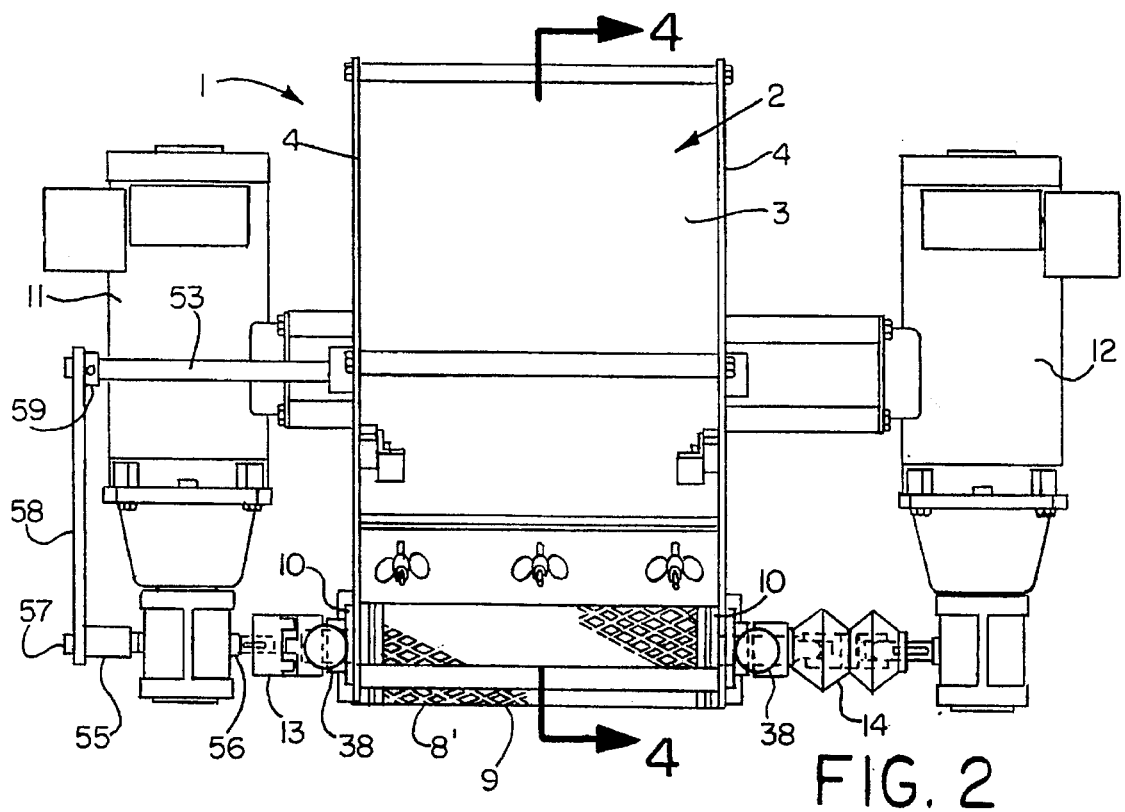
FIG. 2 is a side elevation view of the machine of FIG. 1 as seen from the right-hand side of FIG. 1.
Figure 3:
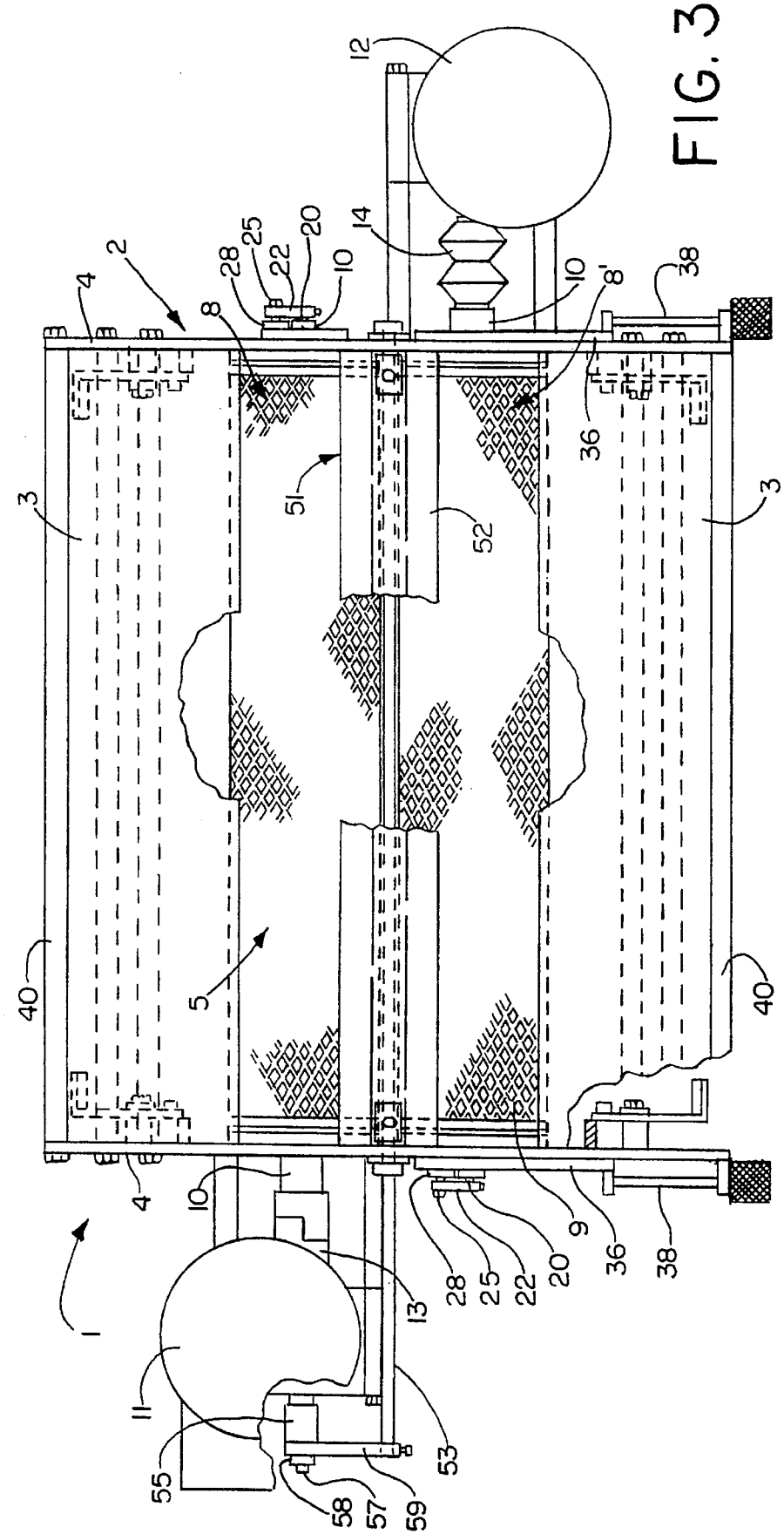
FIG. 3 is an enlarged fragmentary top plan view of the machine of FIGS. 1 and 2.

At the ends of the grid die rolls 8, 8' are bushings 10 suitably rotatably journalled for rotation by separate drive motors 11, 12 and associated couplings 13, 14 mounted at opposite ends of the hopper (see especially FIGS. 1–3). The grid die rolls are counter-rotated with the direction of rotation being such that the upper surfaces of the rolls move toward each other as they move against the material in the hopper, causing the material in the hopper to separate from adjacent material and flow both through and between the grid die rolls.

Figure 6:
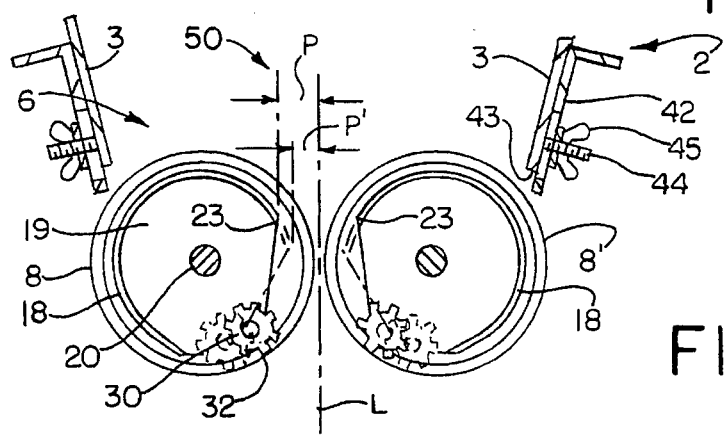
FIG. 6 is a schematic fragmentary transverse section through the grid die rolls of the machine, showing the shields or deflector plates in different adjusted positions within the grid die rolls.
Figure 5:
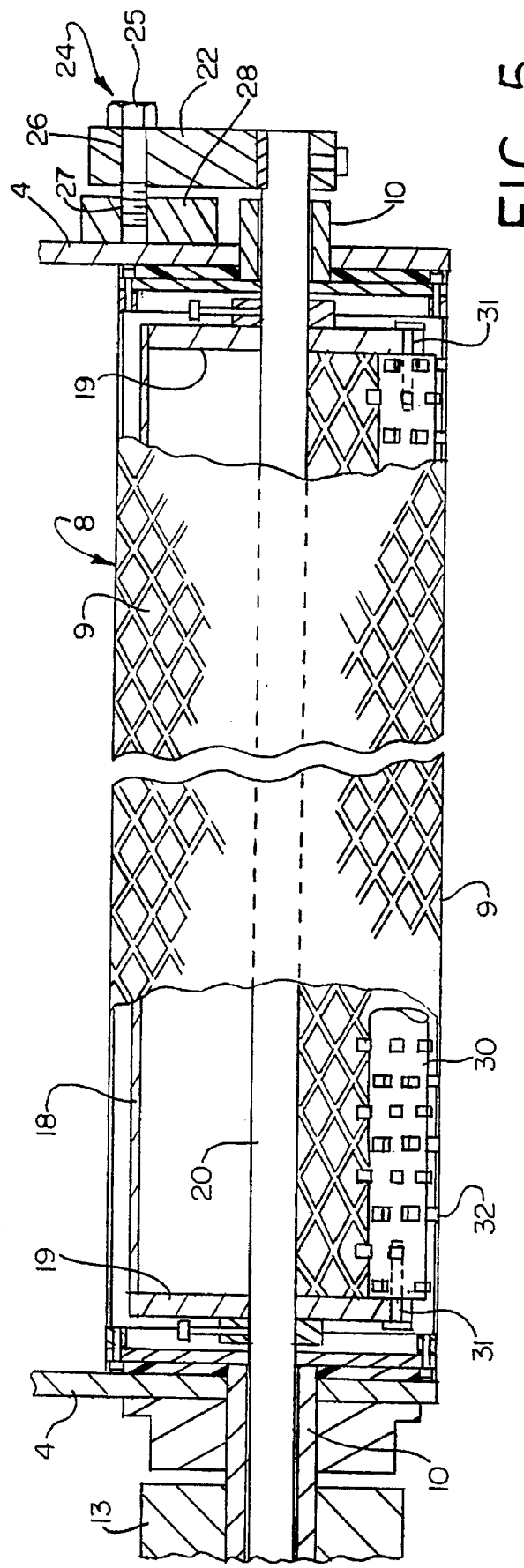
FIG. 5 is an enlarged fragmentary longitudinal section through one of the grid die rolls showing the associated shield or deflector plate and pin roll mounted within the grid die roll which form part of the machine of the present invention.

To prevent the material which enters the grid die rolls 8, 8' through the openings 9 from completely filling the grid die rolls and forming a compact solid mass inside the rolls, a semi-cylindrical shield or deflector plate 18, shown in FIGS. 4–6, is mounted within each grid die roll in underlying relation to the openings 9 in the upper surfaces of the rolls.

The shields or deflector plates 18 extend substantially the entire interior length of the grid die rolls 8, 8' and have radially extending flanges 19 at opposite ends for mounting of the plates 18 on separate shafts 20 each having their ends journalled within the grid die roll bushings 10. The ends of the shafts 20 opposite the respective motor drive couplings 13, 14 extend axially outwardly beyond the ends of the respective grid die roll bushings 10 for mounting of turning bars 22 thereon (FIGS. 1, 3 and 5). Limited rotation of these turning bars 22 in opposite directions will cause the leading edges 23 (FIGS. 4 and 6) of the shields 18 to move toward and away from a vertical line L tangent to the outer diameter of the grid die rolls 8, 8' for decreasing or increasing the width of the material flow paths P, P' through the grid die rolls as schematically shown in solid and phantom lines in FIG. 6. The larger the flow paths P, P', the more material that can flow through the grid die rolls.

The shields or deflector plates 18 may be locked in any desired adjusted position by providing a suitable lock mechanism 24 for releasably locking the respective turning bars 22 against rotational movement. In the preferred embodiment disclosed herein, such lock mechanism 24 comprises a threaded bolt 25 which is adapted to be inserted through a hole 26 in the respective turning bars 22 and threaded into any one of a plurality of circumferentially spaced threaded openings 27 in a suitable block member 28.

The end flanges 19 of the shields or deflector plates 18 extend radially below the mounting shafts 20 for rotatable attachment of the ends of pin rolls 30 to the flanges by stripper bolts 31 (see FIG. 5). The pin rolls 30 have a series of circumferentially spaced pins 32 extending radially outwardly therefrom throughout their entire length that are appropriately spaced to enter the openings 9 in the bottom portion of the grid die rolls 8, 8' as the grid die rolls rotate to push the material entering the grid die rolls that drops down below the leading edge 23 of the shields or deflector plates 18 out through the bottom openings 9 for deposit onto or coating of a product or object passing therebeneath.

Rotational movement of the pin rolls 30 is caused by the meshing of the pins 32 in the openings 9 in the grid die rolls 8, 8' as the grid die rolls are driven by their respective motors. Because the pin rolls continuously operate to push the material that clears the leading edge 23 of the shields or deflector plates 18 out through the bottom openings 9 in the grid die rolls, almost no material is left within the interior of the grid die rolls after the grid die rolls pass the pin rolls, thus making the grid die rolls self cleaning.

The spacing between the grid die rolls 8, 8' may also be varied for controlling the amount of material flow between the grid die rolls by mounting one or both grid die rolls for movement toward and away from each other. In the embodiment disclosed herein, only one of the grid die rolls 8' is mounted for movement toward and away from the other grid die roll 8. To that end, the end bushings 10 for the movable grid die roll 8' are supported by slides 35 engaging guides 36 for movement of the bushings within slots 37 in the hopper end walls 4. Accurate adjustment of the slides 35 may be obtained by turning a pair of roll slide adjustment rods 38 having threaded engagement with the slides.

The rods 38 are retained against axial movement with respect to the hopper end walls 4, whereby turning of the rods in opposite directions will cause the slides and thus the grid die roll 8' supported thereby to move in and out relative to the other grid die roll 8, varying the spacing therebetween. In such case, the coupling 14 between the drive motor 12 and associated grid die roll 8' is in the form of a universal joint to accommodate such movement of the grid die roll relative to the motor 12, which is fixed. Also, the block member 28 which contains the threaded openings 27 for threaded engagement by the bolt 25 to releasably lock the shaft 20 for the associated shield or deflector plate 18 against turning movement is attached to the respective slides 35 (see FIGS. 1, 3 and 4).

The amount of agitation of the grid die rolls 8, 8' against the material in the hopper 2 may be varied by pivotally mounting the upper ends of the hopper side walls 3 to the end walls 4 by pivot shafts 40 to allow the lower ends of the hopper side walls to be moved inwardly and outwardly relative to the upper surfaces of the grid die rolls to expose less or more of the grid die rolls to the material within the hopper. Such lateral adjustment of the hopper side walls 3 may be achieved by loosening nuts 41 on stub shafts 42 extending outwardly from the hopper end walls 4 through slots 43 in brackets 44 pivotally connected to the hopper side walls 3 and pivoting the hopper side walls in and out about the pivot shafts 40 as schematically illustrated in FIG. 4.

Preferably, the hopper side walls 3 are laterally adjustable between approximately the 12 o'clock positions directly over the top center of the grid die rolls 8, 8' shown in phantom lines in FIG. 4 and the 9 or 10 o'clock position in the case of the left-hand roll and the 2 or 3 o'clock position in the case of the right-hand roll shown in solid lines in FIG. 4 to expose more or less of the agitating rolls to the stored material. The more self-adhering or compactible the material, the more surface area of the grid die rolls that should desirably be exposed to the stored material to increase the agitation and grinding or separating action. The less self-adhering and the more free flowing the material, the less surface area of the grid die rolls should be exposed to the material to reduce the amount of agitation of the grid die rolls against the material.

As can be seen in FIG. 4, as the hopper side walls are pivoted in and out relative to the grid die rolls 8, 8', the clearance space between the bottom of the hopper side walls and outer diameter of the grid die rolls changes. In order to control such clearance space, adjustable end plates 42 are desirably mounted on the hopper side walls adjacent the bottom edges 43 thereof. The end plates may be moved up and down relative to the bottom edges 43 of the hopper side walls 3 as by providing threaded stub shafts 44 on the exterior of the hopper side walls which extend through slots 45 in the end plates 42, and wing nuts 46 on the outer ends of the threaded shafts 44 for releasably securing the end plates against movement relative to the hopper side walls.

To keep the head pressure or weight of the mass of stored material in the hopper 2 from forcing the stored material into the vortex area 50 between the grid die rolls 8, 8', an agitator bar assembly 51 is mounted in the hopper in overlying relation to the vortex area for deflecting the stored material away from the vortex area. The stored material thus has to work around the agitator bar assembly, whereby the exposure of the stored material to the rotating grid die rolls 8, 8' will determine how much stored material is being dispensed at all times rather than the weight of the mass of the stored material pushing down on the vortex area between the grid die rolls.

In the preferred embodiment disclosed herein, the agitator bar assembly 51 includes a generally inverted V-shaped head pressure relief plate 52 extending substantially the full length of the hopper positioned over the middle or vortex area 50 between the two grid die rolls (FIGS. 3 and 4). The deflector plate 52 is suspended from an agitator shaft 53 in the hopper by support brackets or hangers 54 at opposite ends of the deflector plate. The agitator shaft 53 is desirably rotated back and forth over a relatively narrow angle of rotation to cause the deflector plate 52 to oscillate back and forth to a slight extent within the stored material (for example, approximately ⅜ inch in each direction) to slightly agitate or stir the stored material within the hopper, thus helping the stored material to flow around and under the deflector plate 52 and into engagement with the grid die rolls.

The agitator shaft 53 may be driven off the drive motor 11 for the grid die roll 8 by providing a second speed reduced drive shaft 55 on the motor 11 extending in the opposite direction of the motor drive shaft 56 to which the grid die roll 8 is connected (see FIG. 2). Mounted on the second drive shaft 55 is an eccentric crank pin 57 used to drive a first link 58 having one end pivotally connected to the crank pin and its other end pivotally connected to a second link 59 pivotally connected to the outer end of the agitator shaft 53. As the second drive shaft 55 is driven at a reduced speed through a speed gear reducer, the offset connection 57 to the linkage arm 58 causes the linkage arm 58 to move up and down, which in turn causes the agitator shaft 53 to rotate back and forth through a small arc, whereby the head pressure plate 52 is slowly moved back and forth (oscillated) within the hopper.

The various components of the machine and particularly those which contact the material being dispensed preferably are constructed of stainless steel or similar material which does not corrode, so that the machine can be easily kept in sanitary condition as by steam cleaning. Also, the drive motors 11, 12 may be easily and quickly detached and removed so that the other components of the machine may be cleaned without subjecting the motors to the cleaning environment.

The roller dispenser machine 1 of the invention may be constructed in different widths to vary the output or discharge of the material therefrom. Two or more of the machines may also be arranged in endwise and/or staggered relation to increase the width and/or output of materials discharged therefrom. Moreover, such machines may be mounted on a generally C-frame dolly (not shown) for easy positioning of the machines wherever desired.

Although the invention has been shown and described with respect to a certain preferred embodiment, it is obvious that equivalent alterations and modifications will occur to others skilled in the art upon the reading and understanding of the specification. The present invention includes all such equivalent alterations and modifications, and is limited only by the scope of the claims.

What is claimed is:

1. A material dispenser comprising a hopper for material to be dispensed, said hopper having a bottom opening for discharge of material therefrom, a pair of cylindrical rolls mounted in parallel relation adjacent said bottom opening, and means for counter-rotating said cylindrical rolls in a direction causing the upper surface of said cylindrical rolls to move toward each other through the material in said hopper, said cylindrical rolls having a hollow interior and an exterior surface containing openings which break up the material, some of the material entering and exiting said hollow interior through said openings.

2. The dispenser of claim 1 further comprising means for moving said cylindrical rolls toward and away from each other for decreasing and increasing the spacing between said cylindrical rolls.

3. The dispenser of claim 1 further comprising a head pressure relief plate mounted within said hopper in overlying relation to a middle area between said cylindrical rolls.

4. The dispenser of claim 3 further comprising means for causing limited oscillating movement of said head pressure relief plate within said hopper.

5. The dispenser of claim 4 wherein said head pressure relief plate is suspended by hangers from a shaft extending through said hopper, said shaft being drivingly connected to said other drive shaft through an eccentric drive connection.

6. A material dispenser comprising a hopper for material to be dispensed, said hopper having a bottom opening for discharge of material therefrom, a pair of cylindrical rolls mounted in parallel relation adjacent said bottom opening, and means for counter-rotating said cylindrical rolls in a direction causing the upper surface of said cylindrical rolls to move toward each other through the material in said hopper, said cylindrical rolls containing openings which break up the material, said cylindrical rolls being made of expanded metal grid material containing said openings therein.

7. A material dispenser comprising a hopper for material to be dispensed, said hopper having a bottom opening for discharge of material therefrom, a pair of cylindrical rolls mounted in parallel relation adjacent said bottom opening, means for counter-rotating said cylindrical rolls in a direction causing the upper surface of said cylindrical rolls to move toward each other through the material in said hopper, said cylindrical rolls containing openings which break up the material, and deflector means within said cylindrical rolls for preventing material entering said cylindrical rolls through said openings therein from completely filling the interior of said cylindrical rolls.

8. The dispenser of claim 7 wherein each of said deflector means comprises a semi-cylindrical deflector extending substantially the entire interior length of said cylindrical rolls in underlying relation to the upper surface of said cylindrical rolls.

9. The dispenser of claim 2 wherein said deflectors have leading edges facing each other in spaced relation for permitting passage of material through said cylindrical rolls.

10. The dispenser of claim 9 further comprising means for moving said deflectors toward and away from each other within said cylindrical rolls for varying the spacing between the leading edges of said deflectors.

11. The dispenser of claim 10 wherein said means for moving said deflectors comprises shafts extending through said cylindrical rolls on which said deflectors are mounted, and handle means at one end of said shafts for limited turning movement of said shafts in opposite directions.

12. The dispenser of claim 11 further comprising means for releasably locking said shafts against turning movement.

13. The dispenser of claim 9 further comprising pusher means within said cylindrical rolls for pushing material within said cylindrical rolls out through said openings in the bottom surfaces of said cylindrical rolls.

14. The dispenser of claim 13 wherein said pusher means comprises pin rolls mounted within said cylindrical rolls below said deflectors, said pin rolls having pins extending radially outwardly therefrom into said openings in the bottom surfaces of said cylindrical rolls.

15. The dispenser of claim 14 further comprising shaft means for supporting said deflectors and said pin rolls within said cylindrical rolls, and means for locking said shaft means against turning movement.

16. The dispenser of claim 15 wherein said deflectors have flanges at opposite ends which support said deflectors on said shaft means, said flanges extending downwardly below said shaft means to provide end supports for said pin rolls.

17. The dispenser of claim 16 further comprising means for unlocking said shaft means to permit limited rotation of said shaft means in opposite directions for varying the spacing between said deflectors.

18. A material dispenser comprising a hopper for material to be dispensed, said hopper having a bottom opening for discharge of material therefrom, a pair of cylindrical rolls mounted in parallel relation adjacent said bottom opening, means for counter-rotating said cylindrical rolls in a direction causing the upper surface of said cylindrical rolls to move toward each other through the material in said hopper, said cylindrical rolls containing openings which break up the material, a head pressure relief plate mounted within said hopper in overlying relation to a middle area between said cylindrical rolls, and means for causing limited oscillating movement of said head pressure relief plate within said hopper, said means for counter-rotating said cylindrical rolls comprising separate motor means for driving each of said cylindrical rolls, one of said motor means having two drive shafts extending in opposite directions, one of said drive shafts being connected to one of said cylindrical rolls, and the other drive shaft being connected to said head pressure relief plate for causing oscillating movements of said head pressure relief plate within said hopper.

19. The dispenser of claim 18 wherein the other cylindrical roll is movable toward and away from said one cylindrical roll for varying the spacing between said cylindrical rolls, and the other motor means is connected to said other cylindrical roll by a universal joint.

20. A material dispenser comprising a hopper for material to be dispensed, said hopper having a bottom opening for discharge of material therefrom, cylindrical roll means mounted in parallel relation adjacent said bottom opening, and means for rotating said cylindrical roll means, said cylindrical roll means containing openings through which material from said hopper passes, said cylindrical roll means being made of expanded metal grid material containing said openings.

21. A material dispenser comprising a hopper for material to be dispensed, said hopper having a bottom opening for discharge of material therefrom, cylindrical roll means mounted in parallel relation adjacent said bottom opening, means for rotating said cylindrical roll means, said cylindrical roll means containing openings through which material from said hopper passes, and pusher means for pushing material within said cylindrical roll means out through openings in a lower surface of said cylindrical roll means.

22. The dispenser of claim 21 wherein said pusher means comprises pin roll means mounted within said cylindrical roll means, said pin roll means having pins extending radially outwardly therefrom into said openings in said lower surface of said cylindrical roll means.

23. A material dispenser comprising a hopper for material to be dispensed, said hopper having a bottom opening for discharge of material therefrom, cylindrical roll means mounted in parallel relation adjacent said bottom opening, means for rotating said cylindrical roll means, said cylindrical roll means containing openings through which material from said hopper passes, and deflector means within said cylindrical roll means for preventing material entering said cylindrical roll means through openings in an upper surface of said cylindrical roll means from completely filling the interior of said cylindrical roll means.

24. The dispenser of claim 23 wherein said deflector means comprises a semi-cylindrical plate extending substantially the entire interior length of said cylindrical roll means in underlying relation to said upper surface of said cylindrical roll means.

25. The dispenser of claim 24 further comprising shaft means extending through said cylindrical roll means for supporting said deflector means within said cylindrical roll means, and means for securing said shaft means against turning.

26. A material dispenser comprising a hopper for material to be dispensed, said hopper having a bottom opening for discharge of material therefrom, a pair of cylindrical rolls mounted in parallel relation adjacent said bottom opening, and means for counter-rotating said cylindrical rolls in a direction causing the upper surface of said cylindrical rolls to move toward each other through the material in said hopper, said cylindrical rolls containing openings which break up the material, said hopper including side walls having upper and lower ends, said lower ends terminating above said cylindrical rolls, said upper ends being pivotable for moving said lower ends in and out relative to each other above said cylindrical rolls while maintaining the spacing between said cylindrical rolls for decreasing and increasing the amount of surface area of said cylindrical rolls exposed to the material in said hopper.

27. The dispenser of claim 26 further comprising end plates protruding downwardly below the lower ends of said hopper side walls, said end plates being movable relative to said hopper side walls for varying the clearance space between said end plates and the outer diameter of said cylindrical rolls.

28. A material dispenser comprising a hopper for material to be dispensed, said hopper having a bottom opening for discharge of material therefrom, cylindrical roll means mounted in parallel relation adjacent said bottom opening, said cylindrical roll means having a hollow interior, and means for rotating said cylindrical roll means, said cylindrical roll means having an exterior surface containing openings through which material from said hopper enters and exits said hollow interior of said cylindrical roll means.

* * * * *